United States Patent [19]
Nicholson

[11] Patent Number: 5,697,451
[45] Date of Patent: Dec. 16, 1997

[54] CROP CLEANER

[75] Inventor: Alan Nicholson, Near Downham Market, United Kingdom

[73] Assignee: Nicholson Farm Machinery Co. Ltd., United Kingdom

[21] Appl. No.: 576,062

[22] Filed: Dec. 21, 1995

[51] Int. Cl.$^6$ .................................................. A01D 29/00
[52] U.S. Cl. ........................................... 171/133; 171/63
[58] Field of Search ........................... 171/133, 63, 111, 171/113, 115, 126; 198/588, 812, 781.01, 810.01; 193/35 TE

[56] References Cited

U.S. PATENT DOCUMENTS

| | | | |
|---|---|---|---|
| 1,239,400 | 9/1917 | Jones | 198/810.01 |
| 1,319,936 | 10/1919 | Wentworth | 171/133 |
| 1,519,244 | 12/1924 | Evans | 193/35 TE |
| 1,771,541 | 7/1930 | Larsen | 171/133 |
| 2,395,599 | 2/1946 | Webb et al. | 198/810.01 |
| 2,531,379 | 11/1950 | Chickering | 171/133 |
| 2,670,846 | 3/1954 | Rienks et al. | 171/133 |
| 2,797,793 | 7/1957 | Wilde et al. | 198/810.01 |
| 3,184,029 | 5/1965 | Loosli | 171/133 |
| 3,276,558 | 10/1966 | Guske et al. | 193/35 TE |
| 3,750,211 | 8/1973 | Zaun et al. | 171/133 X |
| 3,771,651 | 11/1973 | Hook | 171/133 X |
| 4,049,058 | 9/1977 | Eisenhardt et al. | 171/58 |
| 4,260,053 | 4/1981 | Onodera | 198/812 |
| 4,266,650 | 5/1981 | Patel et al. | 193/35 TE |
| 4,416,334 | 11/1983 | Bouillon | 171/133 X |
| 4,471,876 | 9/1984 | Stevenson, Jr. et al. | 209/618 |
| 4,699,218 | 10/1987 | Schwitters | 171/133 X |
| 5,143,194 | 9/1992 | Sang | 198/810.01 X |
| 5,247,717 | 9/1993 | Smith | 171/63 X |

FOREIGN PATENT DOCUMENTS

| | | |
|---|---|---|
| 2 511 575 | 2/1983 | France . |
| 43 40 101 | 6/1995 | Germany . |
| 85 21 009 | 3/1996 | Germany . |

Primary Examiner—Terry Lee Melius
Assistant Examiner—Victor Batson
Attorney, Agent, or Firm—Fishman, Dionne, Cantor & Colburn

[57] ABSTRACT

A crop cleaner comprising a generally parallel array of first and second rollers each first roller being scrolled and each second roller generally unscrolled, the first rollers alternating with second rollers with pairs of adjacent rollers being carried on frames with each frame being displaceable relative to an adjacent frame and a drive for independently rotating each pair of rollers.

10 Claims, 3 Drawing Sheets

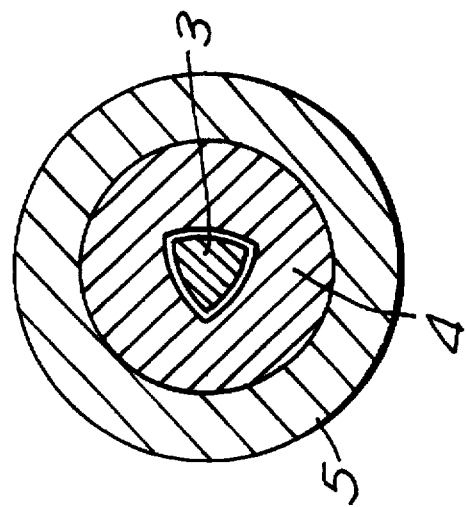
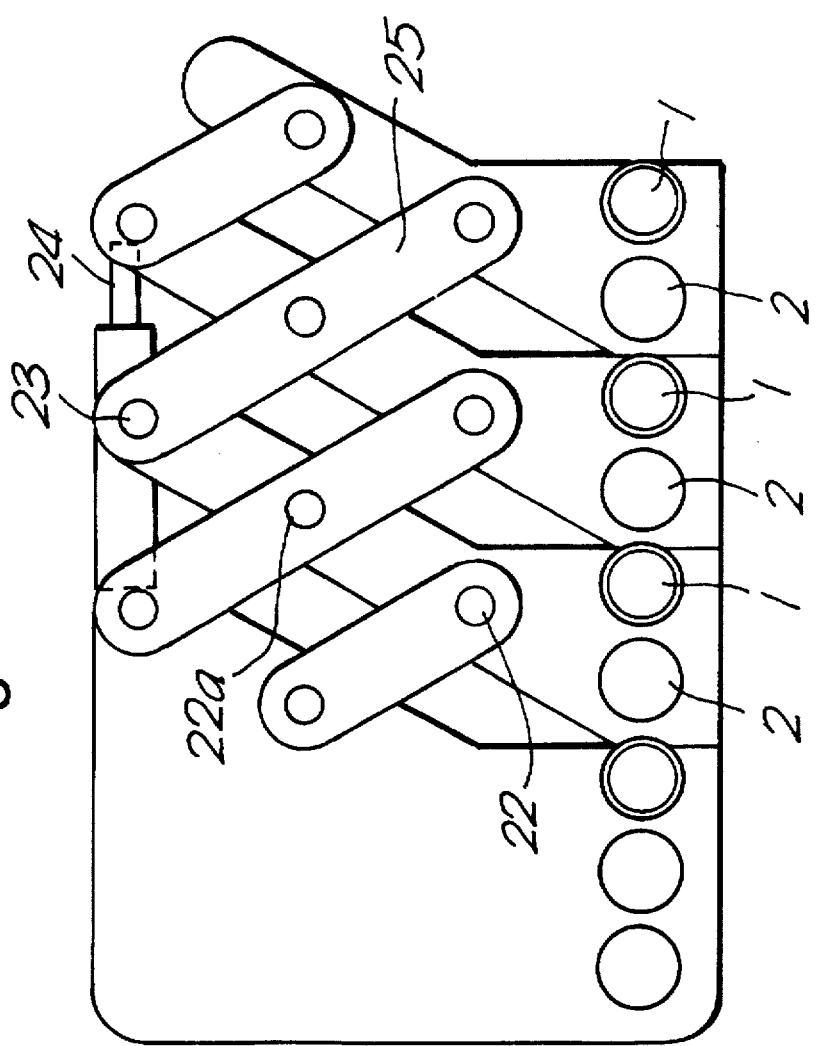

CROP CLEANER

This invention relates to a crop cleaner. More especially but not exclusively to the invention relates to a cleaner for cleaning potatoes, carrots and beet.

Crop cleaners and conveyors have been known hitherto but suffer from disadvantages. For example U.S. Pat. No. 4,120,362 describes a crop cleaner having a plurality of scrolled rollers perpendicular to the direction of crop travel. The rollers are mounted on resilient biases allowing yielding movement if a stone is caught in the nip of a pair of rollers. The rollers are driven by a chain and sprocket.

U.S. Pat. No. 4,192,386 describes a crop cleaner. A plurality of con-rotating scrolled rollers are provided. One roller has an inner core which is partially exposed and counter rotates to feed the beet on to a conveyor for further processing.

U.S. Pat. No. 5,197,550 describes a beet harvester. Rollers are provided to concentrate the beet from the relatively wide input stage to a relatively narrow output stage. Alternate rollers are scrolled the reminder being plain. The spacing between adjacent rollers is said to be adjustable but means to achieve this end are not described. A band drives the rollers by sheaves and idler wheels.

GB-2222507 describes a crop harvester. Material is picked up by a share and passed to a series of starwheels. The material is transferred to a belt conveyor and from there to a roller arrangement. The roller arrangement is not described.

WO92/04816 describes a crop cleaner in which alternate rollers are scrolled and the remainder plain. The crop is fed in parallel to the axes of the rollers.

None of the above arrangements are flexible enough for use in a wide range of conditions without complex adjustment. The invention seeks to at least reduce the problems of the prior art.

According to the invention there is provided a crop cleaner comprising a generally parallel array of first and second rollers each first roller being scrolled and each second roller generally unscrolled, the first rollers alternating with second rollers with pairs of adjacent rollers being carried on frames with each frame being displaceable relative to an adjacent frame and a drive for independently rotating each pair of rollers.

According to some embodiments of the invention an independent drive for driving each other is provided.

Preferably the drives are of adjustable speed.

More preferably the drives are capable of rotating the rollers in either direction.

Yet more preferably the drives are capable of driving a first roller at rotation differing from the rotation rate of the second roller carried on the same frame as the first roller by 25 to 40% calculated on the rate of rotation of the first roller.

Preferably the drive comprises a hydraulic motor.

Preferably means for displacing the adjacent frames are provided.

Preferably a sensor to detect overload and a reversor to reverse the rotation of the rollers is provided.

Preferably the rollers comprises resilient members which may be segmented carried on a drive shaft.

The drive shape may have an epitrochoid cross-section.

Embodiments of the invention will now be described by way of example only by reference to the accompanying figures of which:

FIG. 3 is a side view of the array of FIG. 2 in a second configuration.

FIG. 4 is a cross-section of a roller.

Figure 1:
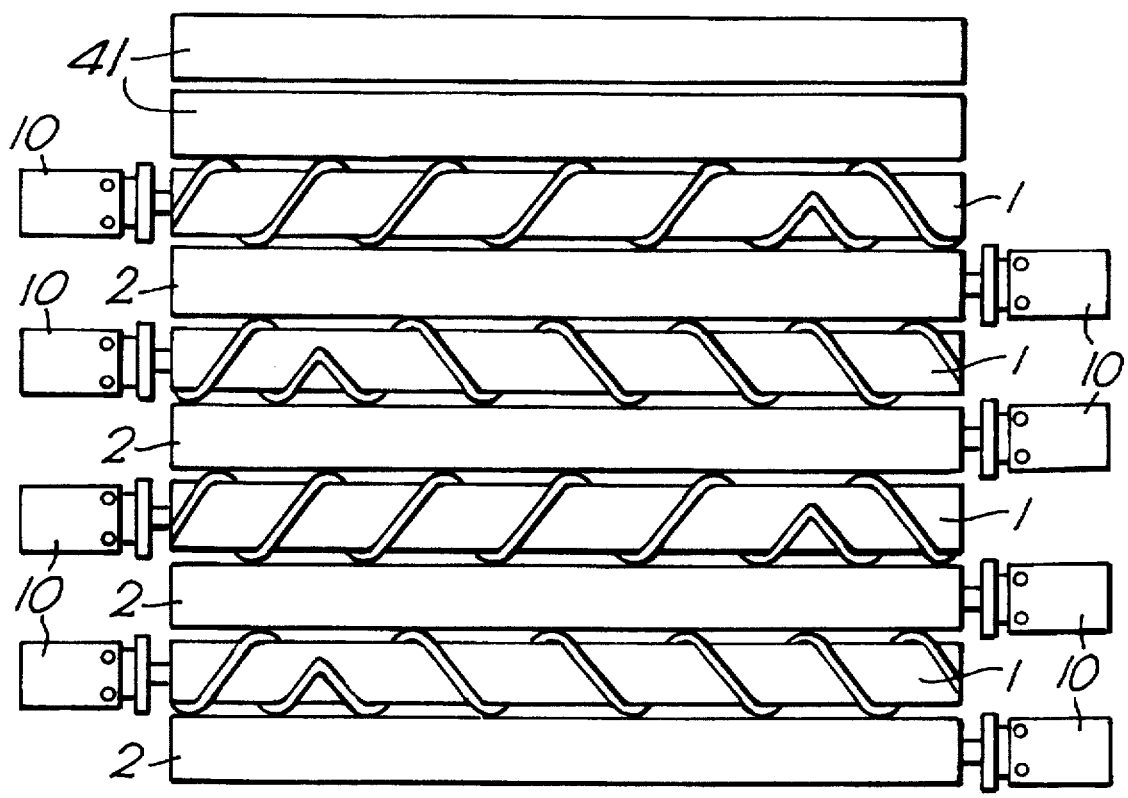
FIG. 1 is a plan view of an array of rollers.
Figure 2:
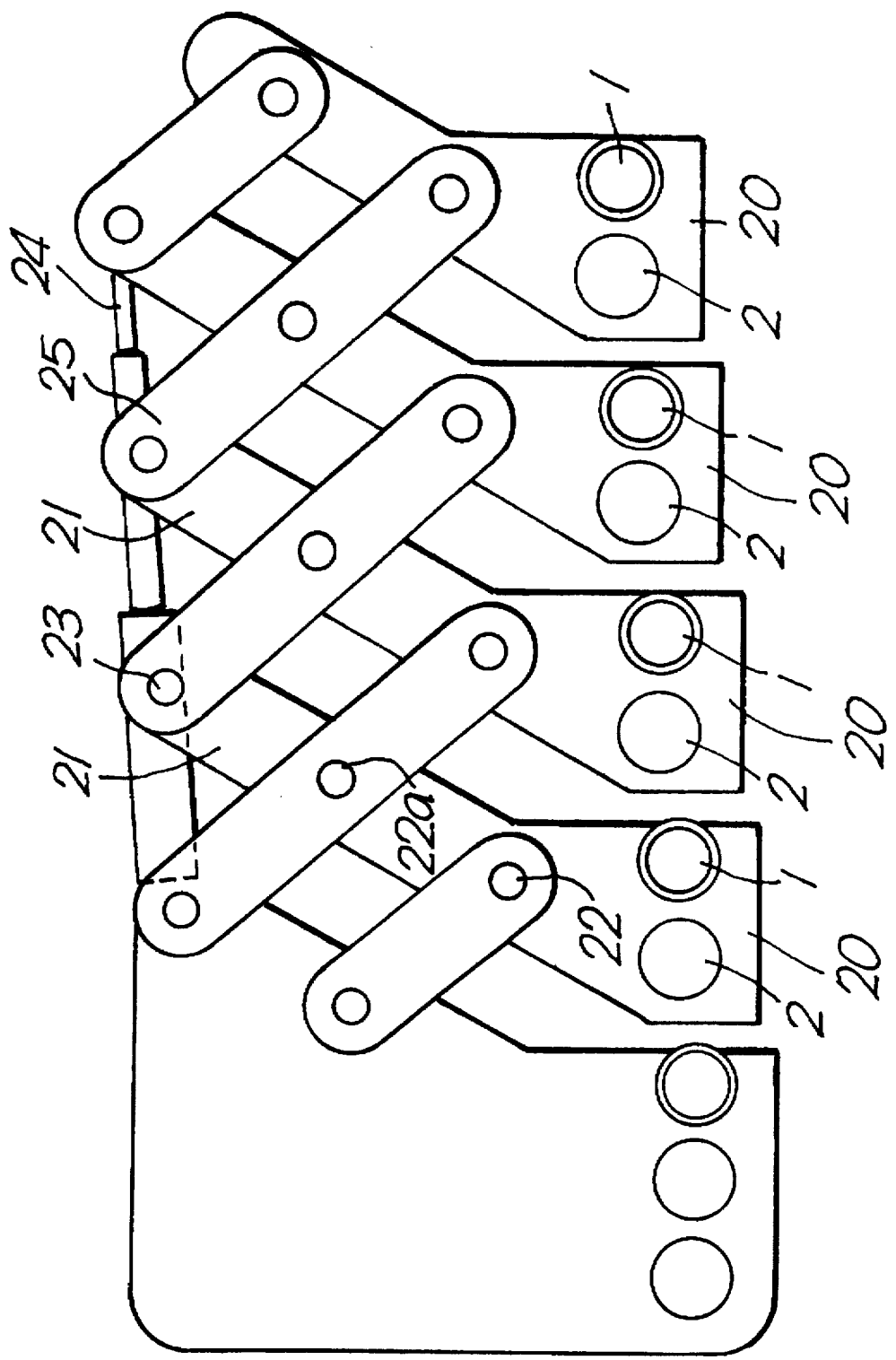
FIG. 2 is a side view of an array of rollers carried in frames in a first configuration.

The cleaner is provided with an array of rollers. A first set of rollers 1 are scrolled and a second set of rollers 2 are generally unscrolled. The rollers are preferably resilient and may for example be rubberised. Conveniently each roller is carried on a drive shale 3 which is preferably lobed especially epitrochoid. The drive shaft can conveniently be received in a corresponding cavity 4 of the roller. The roller may comprise a metallic core 5, for example an extrusion, onto which rubber is vulcanised. The roller could also be of plastics and/or steel. Preferably the roller comprises a plurality of segments for example 100 to 200 mm especially about 150 mm long received on a drive shaft. This is advantageous for two reasons. First stones and flints may get caught in the nip between a pair of rollers damaging the resilient material. If the resilient material is damaged, the damaged cylindrical segment can be removed and replaced without the need to replace the whole roller. Secondly it may be desirable to change the scrolling on the rollers, as for example described hereinafter, greater flexibility is achieved by having the rollers in segments. Conveniently the scroll on each segment covers one or two complete turns.

In the illustrated embodiment each roller is provided with a drive for example a hydraulic motor 10. Pressurised fluid can be supplied in conventional way to the motors. It is desirable the motors are speed controllable. The controls may be remote for example in cab of a vehicle on which the cleaner is mounted. It is preferred that at least some of the rollers, especially the unscrolled rollers, are reversible. Means to reverse a pair of adjacent rollers if an object is trapped in the nip are preferably provided. This can comprise a load sensor to sense the resistance to rotation of the rollers. When the load exceeds a critical level rotation is reversed for a short time to dispel the trapped object. This arrangement reduces disruption compared with arrangements in which all rollers are reversed.

The rollers are carried on frames 20 which preferably are movable relative to one another so as to increase the distance between the centres of the rollers. A preferred way of doing this is to provide each frame with an extension piece 21 provided with pivots 22, 22a, 23. The extension pieces form a parallelogram linkage with arms 25. Advancement or retraction of ram 24 alters the spacing of each frame relative to the next.

The use of embodiments of the invention will now be described. The rollers are caused to conrotate relative to adjacent rollers. Typically the scrolled rollers are caused to rotate at about 725 rpm while the plain rollers rotate at about 540 rpm. This is preferred since the shear between the con-rotating rollers will tend to remove accumulation of debris. Preferably means for varying the speed of the rollers is provided. Hitherto doctor blades have been provided but have proved to be of limited usefulness.

Crops to be cleaned such as potatoes, beet and carrots are allowed to enter the device from a conveyor via transport rollers 41.

The crop falls into the nip between a first pair of rollers and soil is sheared from it. The scrolls cause a lateral movement of the crop which helps to disperse the crop over the roller. The crop cascades along the sets of rollers being cleaned between pairs of rollers. Cleaned product exits the device and may for example be transported to a store.

The amount of cleaning required is variable. A crop lifted crops from heavy soil in wet conditions will required much greater cleaning than one lifted from peat in dry conditions.

Insufficient cleaning is obviously a disadvantage in that the crop will still be very dirty and a lesser price will be achieved. Over cleaning is a problem too in that cleaning carries with it the risk of damage and thus too much cleaning exposes the crop to unnecessary risk. With commercially available, prior art devices it is difficult to adjust the degree of cleaning action. In accordance with the invention by spacing apart the rollers a greater cleaning action can be achieved. Furthermore where the array of rollers is in the form of an inclined plane with the unscrolled roller of each pair downstream of the associated scrolled roller, the crop has to climb to escape the nip and this too increases the cleaning action.

In some embodiments of the invention some of the pairs of rollers can be rotated in the same direction. This means that they will exert little cleaning action and will mainly convey the crop.

Some crops are covered with a mulch. In many cases as for example with wheat straw this material is efficiently caught in the roller nip. Some very light material like barley straw may lie on top of the crop and not be caught. To overcome this problem a brush can be suspended over the rollers. The resistance to motion is such that the material will then be caught in the nip and removed.

What I claim is:

1. A crop cleaner comprising a generally parallel array of first and second rollers, each first roller being scrolled and each second roller being generally unscrolled, the said rollers being carried on a plurality of frames, each frame carrying a said first roller and a said second roller, the first rollers alternating with second rollers, each frame being displaceable relative to an adjacent frame, and a drive for independently driving each pair of rollers.

2. The crop cleaner of claim 1, wherein the drive is capable of independently driving each roller.

3. The crop cleaner of claim 1, wherein the rate of rotation of one or more rollers is adjustable.

4. The crop cleaner of claim 2, wherein the direction of rotation of at least some of the rollers is reversible.

5. The crop cleaner of claim 1, wherein the drive drives the first roller at a rate of rotation different from the rate of rotation of the second roller carried on the same frame as said first roller by about 25 to 40% calculated on the rate of rotation of the said second roller.

6. The crop cleaner of claim 1, wherein the drive comprises a hydraulic motor.

7. The crop cleaner of claim 1, wherein means of displacing adjacent frames are provided.

8. The crop cleaner of claim 4, wherein a sensor to detect overloaded rollers and means for reversing the rotation of said overloaded rollers are provided.

9. The crop cleaner of claim 1, wherein the rollers each comprise a resilient member carried on a drive shaft.

10. A crop cleaner comprising a generally parallel array of first and seconde rollers, each firsst roller being scroller, the scrolling comprising a first, right handed, scroll portion and a second, left handed scroll portion and each second roller being generally unscrolled, the said rollers being barried on a plurality of frames, each frame carring a said first roller and a second roller, the first rollers alternating with second rollers, each frame being displaceable relative to an adjacent frame, and a drive for independently driving each pair of rollers.

* * * * *